(12) United States Patent
Kozko

(10) Patent No.: US 9,277,121 B2
(45) Date of Patent: Mar. 1, 2016

(54) INTEGRATING A 360 DEGREE PANORAMIC CAMERA WITHIN A FIRE PULL STATION

(71) Applicant: Dmitry Kozko, Aventura, FL (US)

(72) Inventor: Dmitry Kozko, Aventura, FL (US)

( * ) Notice: Subject to any disclaimer, the term of this patent is extended or adjusted under 35 U.S.C. 154(b) by 3 days.

(21) Appl. No.: 14/334,253

(22) Filed: Jul. 17, 2014

(65) Prior Publication Data

US 2016/0021308 A1    Jan. 21, 2016

(51) Int. Cl.
*H04N 7/00* (2011.01)
*H04N 5/232* (2006.01)
*G08B 17/00* (2006.01)

(52) U.S. Cl.
CPC ............ *H04N 5/23238* (2013.01); *G08B 17/00* (2013.01)

(58) Field of Classification Search
CPC .................................................. H04N 5/23238
USPC ............................................................. 348/36
See application file for complete search history.

(56) References Cited

U.S. PATENT DOCUMENTS

| 2004/0066282 | A1* | 4/2004 | Costa et al. ................... 340/287 |
| 2005/0207487 | A1* | 9/2005 | Monroe ................... 375/240.01 |
| 2005/0253728 | A1* | 11/2005 | Chen et al. ..................... 340/577 |
| 2009/0042533 | A1* | 2/2009 | Lontka ....................... 455/404.1 |

* cited by examiner

*Primary Examiner* — Yulin Sun
(74) *Attorney, Agent, or Firm* — Patents on Demand P.A.; Brian K. Buchheit; Scott M. Garrett

(57) ABSTRACT

A 360° camera can be embedded within a fire pull station of a fire alarm system, the fire alarm system can include at least one of a fire detection component, a signaling component, and control panel. The fire pull station can include a mounting bracket and a housing. The mounting bracket can securely affixes the station to a surface. The housing can include of at least one of a power source, a pull, and a circuitry. The 360° camera can include an image sensor and a 360° lense array. The camera can obtain electrical power from the power source of the station.

20 Claims, 4 Drawing Sheets

Embodiment 110

Embodiment 130

Embodiment 150

Embodiment 170

Embodiment 110

Embodiment 130

Embodiment 150

Embodiment 170

Embodiment 410

Embodiment 430

INTEGRATING A 360 DEGREE PANORAMIC CAMERA WITHIN A FIRE PULL STATION

BACKGROUND

The present invention relates to the field of panoramic photography and, more particularly, to integrating a 360° panoramic camera within a fire pull station.

Criminal activity and surveillance activities are often locked in an arms race to counter each other. As criminal and criminal activity becomes increasingly sophisticated, surveillance activities must continue to stay current. Many surveillance options frequently include cameras which can monitor a field of view for illegal and/or suspicious activity. However, many of these cameras have too limited of a field of view which criminals can easily exploit.

Further, cameras are often easily detected by experienced and inexperienced criminals and are frequently destroyed or disabled. This renders the camera and surveillance data/opportunities useless. Often cameras hidden within plain sight (e.g., disguised as innocuous objects) frequently thwart criminals. However, these objects are often decoy objects with little or no functionality. What is needed is a solution for exploiting the hidden nature of decoys and improving traditional surveillance limitations.

BRIEF SUMMARY

One aspect of the present invention can include a system, a method, a computer program product, and an apparatus for integrating a 360° panoramic camera within a fire pull station. A 360° camera can be embedded within a fire pull station of a fire alarm system, the fire alarm system can include at least one of a fire detection component, a signaling component, and control panel. The fire pull station can include a mounting bracket and a housing. The mounting bracket can securely affixes the station to a surface. The housing can include of at least one of a power source, a pull, and a circuitry. The 360° camera can include an image sensor and a 360° lense array. The camera can obtain electrical power from the power source of the station.

Another aspect of the present invention can include a system, a method, a computer program product, and an apparatus for integrating a 360° panoramic camera within a fire pull station. A 360° fire pull station can include of a fire pull station and a 360° camera. The station can include a housing. The housing can include a mounting bracket and a cavity. The mounting bracket can securely affix the station to a surface. The 360° camera can reside within a portion of the cavity. The 360° camera can include a power source, an image sensor, and a 360° lense array. The camera can obtain electrical power from the power source of the station.

Yet another aspect of the present invention can include a method, a system, a computer program product, and an apparatus for integrating a 360° panoramic camera within a fire pull station. A 360° camera can be embedded within a fire pull station of a fire alarm system. The activation of the fire pull station can trigger the 360° camera to analyze an environment proximate to the fire pull station. The camera can include a power source, an image sensor, and a 360° lense array. The camera can be configured to receive power from a power source associated with the fire alarm system. When the analysis yields a fire threat and/or a security threat exists within the proximate environment, an alarm communicatively linked to the fire pull station can be triggered. When the analysis yields no threat exists within the proximate environment, triggering an alarm communicatively linked to the fire pull station can be suppressed.

DETAILED DESCRIPTION

Figure 1:
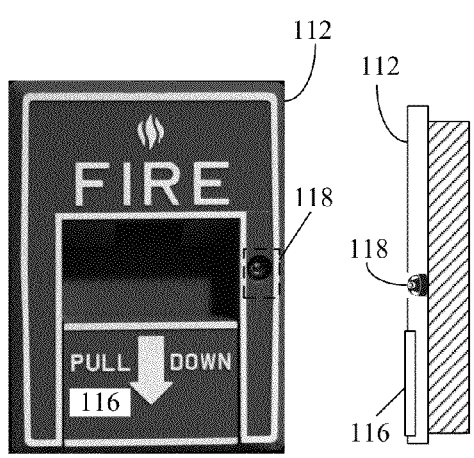
FIG. 1 is a schematic diagram illustrating a set of embodiments for integrating a 360° panoramic camera within a fire pull station in accordance with an embodiment of the inventive arrangements disclosed herein.
Figure 1:
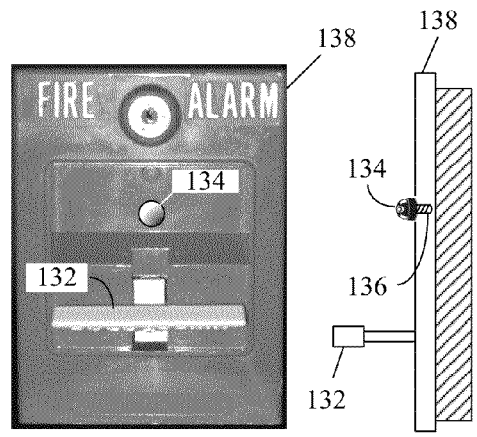
Figure 1:
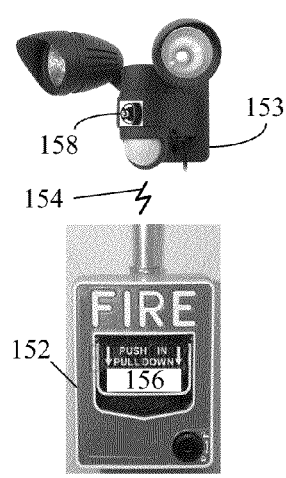
Figure 1:
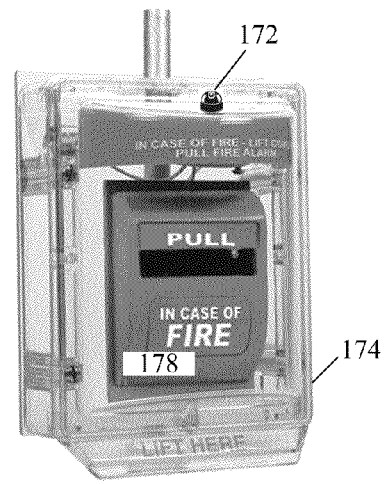

The present disclosure is a solution for integrating a 360° panoramic camera within a fire pull station. In the solution, a 360° camera can be embedded within a fire pull station permitting the station and the camera to function without affecting the functionality of either the station or the camera. That is, the station can function to turn off/on a fire alarm system (e.g., or a fire suppression system) and/or turn on/off the embedded camera. In one embodiment, the 360° camera can function to provide covert surveillance of an indoor/outdoor area (e.g., when the fire pull station associated with a fire alarm system is turned on). In another embodiment, the 360° camera can operate while the station is deactivated (e.g., off). It should be appreciated that multiple panoramic (e.g., wide, ultra-wide) cameras/lenses can be employed to create a 360° view of a physical area.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of embodiments 110, 130, 150, 170 for integrating a 360° panoramic camera within a fire pull station in accordance with an embodiment of the inventive arrangements disclosed herein. Embodiments 110, 130, 150, 170 can be present in the context of system 200, embodiments 310, 350, 410, 430.

As used herein, a fire pull station can manual fire alarm activation component that can function as an active fire protection device which can be wall-mounted, and when activated can initiates an alarm associated with a fire alarm system. For example, many fire pull stations can be activated by a pull handle which can complete a circuit which can send an alarm to the fire alarm control panel. It should be appreciated that fire pull station can include, a pull handle, a push mechanism, a push button, and the like.

Fire alarm system can include, but is not limited to, a fire detection system, a fire suppression system, and the like. Fire alarm system can include, but is not limited to, extinguishers (wet, dry), detectors (e.g., smoke detectors), signaling/output components (e.g., strobes/horns), and the like. It should be appreciated that fire alarm system and/or associated components can include, addressable components (e.g., Internet Protocol capable), non-addressable components, and the like. It should be appreciated that fire alarm system can include one or more control panels which can include hardware and/or software (e.g., firmware).

In embodiment 110, 130, 150, 170, one or more 360° cameras can be embedded within a fire pull station and/or associated fire alarm/suppression system components. In one instance, the fire pull station can conform to a traditional fire pull station (e.g., wall mounted). It should be appreciated however, that the disclosure is not limited to a wall mounted fire pull station and other embodiments are contemplated. In one embodiment, a 360° camera can be embedded within a mounting bracket, a fire pull station enclosure, a fire alarm control panel, and the like.

In one instance, multiple 360° cameras can be embedded into multiple fire pull stations within a room enabling a 360° view of the room. In the instance, each camera within each camera within each station can capture a field of view which can be aggregated (e.g., stitched) to form a 360° view of the room.

It should be appreciated that terms panoramic station, integrated 360° camera can refer one or more embodiments described herein. That is, the terms refer to a 360° camera embedded within a fire pull station.

In embodiment 110, a fire pull station 112 can include an embedded 360° camera 118. Station 112 can include, but is not limited to, camera 112, window 118, pull 116, and the like. In one instance, the camera 118 can be placed within a window 114 commonly used for LED indicators (e.g., indicating on/off state), screw mounting holes. In one configuration of the instance, the camera 118 can reside within a cavity within the fire pull station housing. In another configuration of instance, the camera 118 can be embedded within an LED indicator (e.g., epoxy casing). It should be appreciated that camera 118 can include a housing which can appear similar to an LED enabling the camera to be indistinguishable from an LED.

In embodiment 130, fire pull station 138 can include a 360° camera 134 with a screw based coupler 136. In one configuration of the embodiment, camera 134 can replace a fastening screw of a faceplate of station 138 (e.g., fastened to the housing of the station). It should be appreciated that camera 134 can be conspicuous and/or inconspicuous. For example, camera 134 can appear to look like a fastening screw of faceplate positioned behind pull handle 132. That is, camera can be hidden from view until pull handle 132 is activated enabling an initial clandestine surveillance of a user activating the alarm. For example, when handle 138 is pulled, camera 134 can be triggered to capture a view of an individual pulling the handle. In one instance, facial recognition can be employed to determine if an authorized user attempted to activate an alarm using the fire pull station. In the instance, facial recognition can match a user attempting to activate an alarm by matching the user's face against a biometrics database of a set of authorized users. In one use case, when a fire pull station handle is pulled by a student (e.g., non-authorized individual) within a school building, the attempt can be ignored, but when the handle is pulled by a teacher, the alarm can be triggered. That is, the disclosure can minimize false positives commonly associated with pranks. It should be appreciated that a secondary system (e.g., smoke detectors) can be utilized to enable non-authorized users to utilize fire pull station using the traditional manner (e.g., pull handle).

In embodiment 150, a 360° camera 158 can be embedded within a signaling element 153 communicatively linked (e.g., 154) to a fire pull station 152. In one configuration of the embodiment, camera 158 can be embedded within a smoke detector element of a flood light 153. For example, camera 158 can be triggered when handle 156 is pulled. In one embodiment, video obtained from camera 158 can be analyzed to determine the presence of smoke and/or fire. In the embodiment, when the presence of smoke and/or fire is detected, an alarm associated with the fire pull station 152 can be activated.

In embodiment 170, a 360° camera 172 can be integrated within an enclosure 180 of a fire pull station. In one configuration of the embodiment, camera 172 can reside within a protective enclosure 174. In the configuration, camera 172 can be triggered by opening enclosure. In another configuration, camera 172 operation can be independent of enclosure opening/closing. It should be appreciated that enclosure 174 can include transparent portions and/or transparent material enabling the camera 172 to operate normally.

It should be appreciated that 360° camera can be embedded within smart fire pull station including, but not limited to, signaling/output devices, fire suppression devices, and the like. It should be appreciated that the embedded camera can leverage smart components including, but not limited to, display LEDs, timers, wireless transceivers, and the like. In one embodiment, the camera can utilize a WiFi enabled smart stations (e.g., addressable) to transmit video/images from the camera to a communicatively linked device. It should be appreciated that one or more functionalities of embodiment 110, 130, 150, 170 can be combined and/or omitted to enable a real world implementation.

Figure 2:
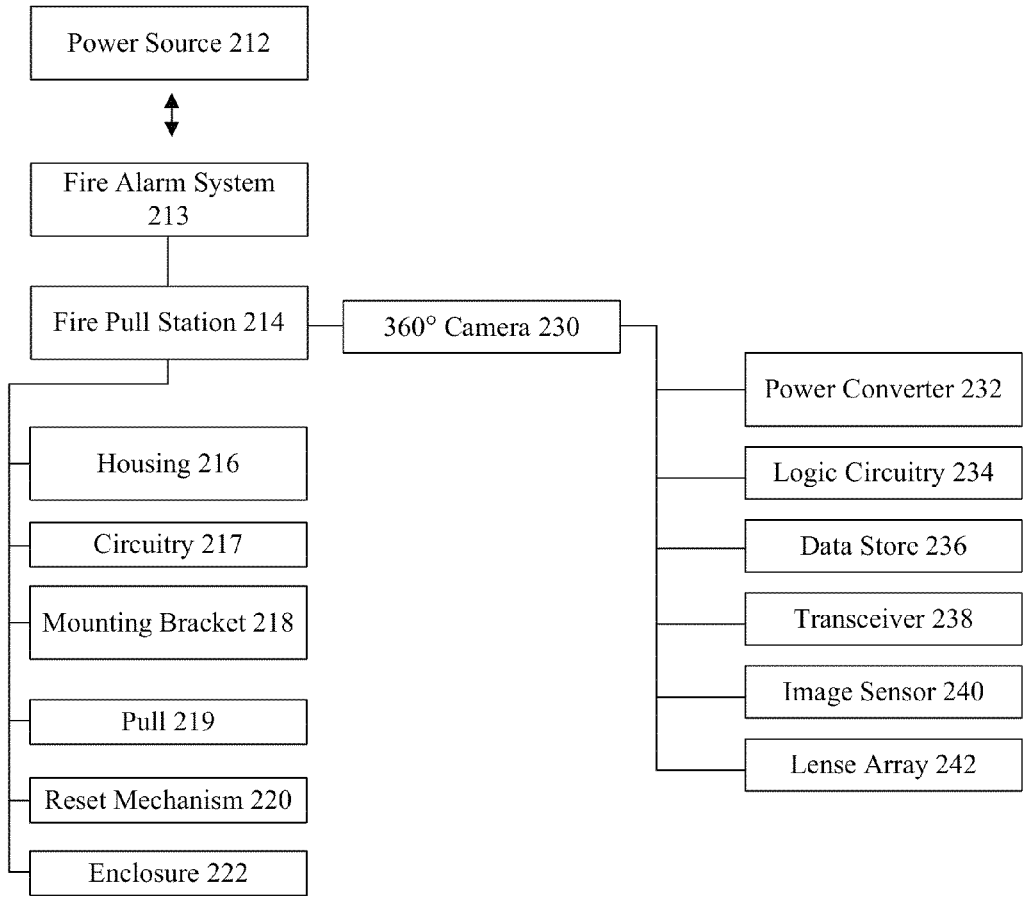
FIG. 2 is a schematic diagram illustrating a system for integrating a 360° panoramic camera within a fire pull station in accordance with an embodiment of the inventive arrangements disclosed herein.

FIG. 2 is a schematic diagram illustrating a system for integrating a 360° panoramic camera within a fire pull station in accordance with an embodiment of the inventive arrangements disclosed herein. System 210 can be present in the context of embodiments 110, 130, 150, 170, 310, 350, 410, 430. It should be appreciated that system 210 can include additional components including, but not limited to, electrical wiring, networking elements (e.g., router, gateway), firmware, and the like.

In system 210, a fire pull station 214 of a fire alarm system 213 can be coupled to a power source 212. Station 214 can include, but is not limited to, 360° camera 230, housing 216, circuitry 217, mounting bracket 218, pull 219, reset mechanism 220, enclosure 222, and the like. It should be appreciated that housing 216 can include cavity 217 which can include wiring, electrical components (e.g., electrical contacts), and the like. In one embodiment, camera 230 can reside partially or entirely within cavity 217. In the embodiment, camera 230 can include shielding, insulation, and the like to ensure normal camera and station functionality.

360° camera 230 can be a panoramic camera with a field of view approximately equal or greater than 180° and/or an aspect ratio of greater than 2:1. In one instance, camera 230 can be a one shot camera which can capture a panoramic field of view. For example, camera 230 can be a 360° camera which can capture a region of 270° horizontally and 90° vertically. Camera 230 can include, but is not limited to, a power converter 232, logic circuitry 234, data store 236, transceiver 238, image sensor 240, lense array 242, and the like.

Power converter 232 can be an electrical and/or electromechanical device for converting electric energy from one form to another (e.g., converting between alternating current and direct current). Power converter 232 can include, but is not limited to, a transformer, a rectifier, a stabilizer, a power supply unit, an inverter, a regulator, and the like. In one instance, converter 232 can be a component of a station 214, system 213, and the like.

Logic circuitry 234 can be an electrical component able to perform one or more logical operations. Circuitry 234 can include, but is not limited to, diodes, transistors, electrical switches, and the like. Circuitry 234 can include, but is not limited to, a processor, a graphics processing unit, and the like. In one instance, circuitry 234 can include, but is not limited to, a power management circuitry, a communications circuitry (e.g., transceiver 238), and the like.

Data store 236 can be a hardware/software element for persisting one or more media data associated with camera 230. Store 236 can persist camera 230 settings, software logic, and the like. For example, store 236 can be utilized to store security rules for permitting camera 230 to function in a surveillance mode. Data store 236 can include, but is not limited to, traditional and/or proprietary form factors, formats, and the like. Data store 236 can include, but is not limited to, flash memory, DRAM based memory, and the like.

Transceiver 238 can be a hardware/software component for receive and or transmitting communication between one or more computing devices. Transceiver 238 can include, but is not limited to, a wireless transceiver, a wired transceiver, and the like. In one instance, transceiver 238 can conform to one or more wireless technologies including, but not limited to, WiFi Direct, BLUETOOTH, ZIGBEE, Z-WAVE, and the like. In one embodiment, transceiver 238 can permit communicative access to camera 230 and/or camera 230 components.

Image sensor 240 can be a hardware/software element for converting an optical image into an electronic signal. Sensor 240 semiconductor charge-coupled devices (CCD), active pixel sensors in complementary metal-oxide-semiconductor (CMOS), N-type metal-oxide-semiconductor (NMOS, Live MOS) technologies, and the like. Sensor size and/or resolution can conform to traditional and/or proprietary form factors and/or resolutions. For example, sensor 240 can be a 1/3.2" sensor with a height of 4.54 millimeters and a width of 3.39 millimeters.

Lense array 242 can be one or more lenses arranged in a uniform or non-uniform arrangement able to focus incident light. Array 242 can include, but is not limited to, a biconvex lens, a plano-convex lens, positive meniscus lens, negative meniscus lens, plano-concave lens, biconcave lens, and the like. In one embodiment, array 242 can be a set of lenses arranged to capture a 360° field of view around a single reference point in space.

Drawings presented herein are for illustrative purposes only and should not be construed to limit the invention in any regard. It should be appreciated that camera 230 components (e.g., image sensor 240, lense array 242) can conform to any traditional and/or proprietary technology. For example, lense array can include an organized layer of oil based lenses (e.g., hexagonal cell type structure). It should be appreciated that camera 230 functionality can include traditional and/or proprietary functionality including, but not limited to, night vision capabilities, low light functionality, infrared mode, thermographic mode, and the like.

Figure 3:
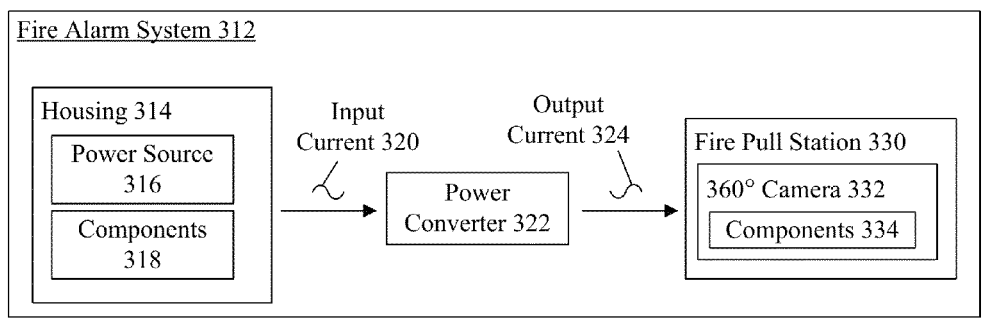
FIG. 3 is a schematic diagram illustrating a set of embodiments for integrating a 360° panoramic camera within a fire pull station in accordance with an embodiment of the inventive arrangements disclosed herein.
Figure 3:
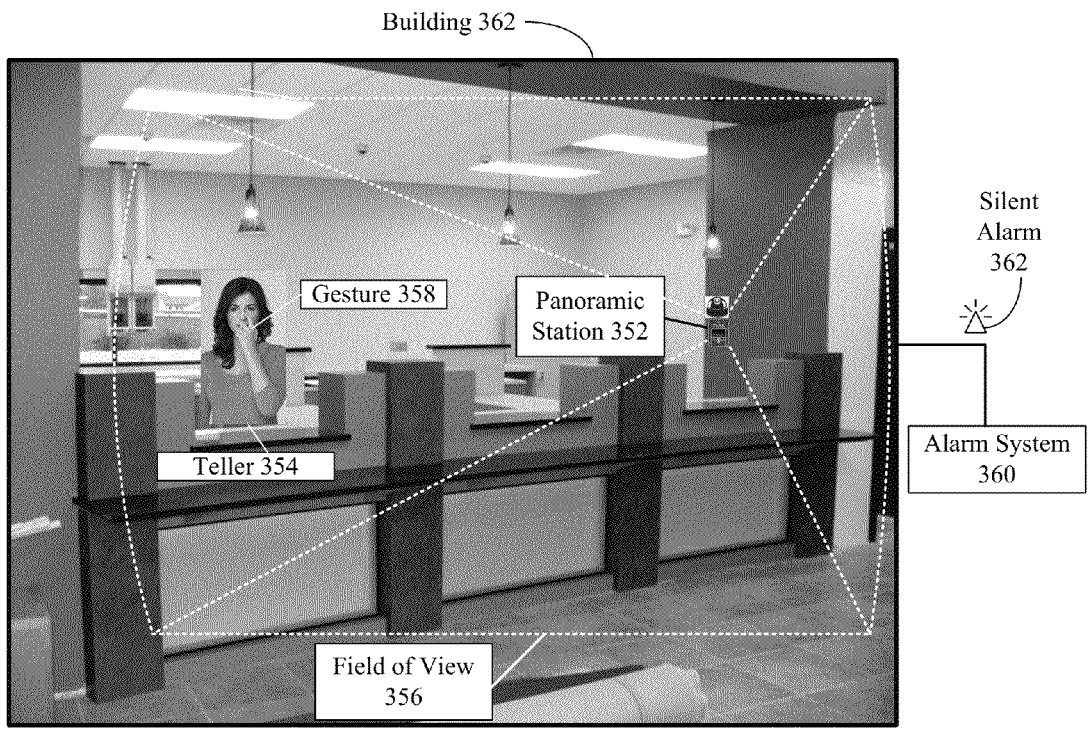

FIG. 3 is a schematic diagram illustrating a set of embodiments 310, 350 for integrating a 360° panoramic camera within a fire pull station in accordance with an embodiment of the inventive arrangements disclosed herein. Embodiments 310, 350 can be present in the context of embodiments 110, 130, 150, 170, system 210, and/or embodiments 410, 430.

It should be appreciated that embodiment 310, 350 are exemplary embodiments and should not be construed to limit the invention in this regard.

In embodiment 310, power converter 322 can permit camera 332 integrated within fire pull station 330 to receive power from fire alarm system 312. That is, station 330 and camera 332 can share output current 324. In the embodiment, system 312 can include housing 314 and pull station 330. Housing 314 can include a power source 316, one or more components 318, and the like. In one instance, power source 316 can produce an input current 320 which can be received by power converter 322. Converter 322 can product output current 324 which can power station 330 and/or camera 332. In one instance, current output 324 can include a 24 volt direct current (DC).

In embodiment 350, a silent alarm 362 can be triggered automatically in response to gesture 358 from teller 354. In the embodiment, a panoramic station 352 (e.g., panoramic camera embedded within a fire pull station) within a building 362 can permit a field of view 356. The station 352 can analyze one or more gestures 358 which can be utilized to trigger alarm 362. For example, during a robbery, a teller 354 can trigger the silent alarm by scratching her nose. It should be appreciated that the disclosure can be coupled to one or more video analysis systems, smart surveillance systems, and the like to enable the functionality described herein. In one embodiment, gestures 358 can be pre-defined or can be dynamically recognized (e.g., facial gestures of distress).

Drawings presented herein are for illustrative purposes only and should not be construed to limit the invention in any regard. It should be appreciated that a 360° camera can be seamlessly integrated into a fire pull station. Embodiments resolving factors (e.g., space, power constraints, visibility, etc) which can affect station and/or 60° camera performance is contemplated.

Figure 4:
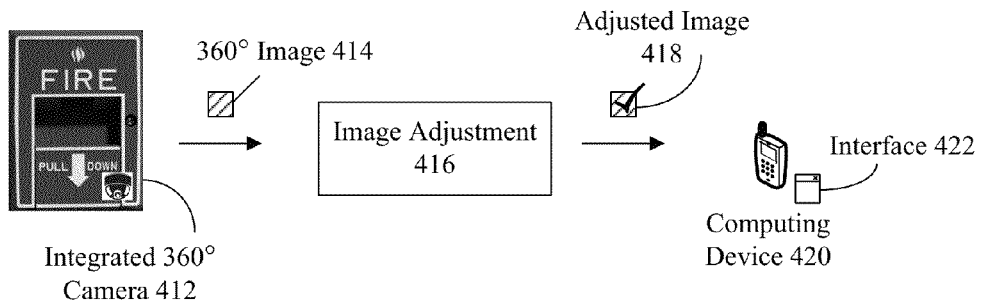
FIG. 4 is a schematic diagram illustrating a set of embodiments for integrating a 360° panoramic camera within a fire pull station in accordance with an embodiment of the inventive arrangements disclosed herein.
Figure 4:
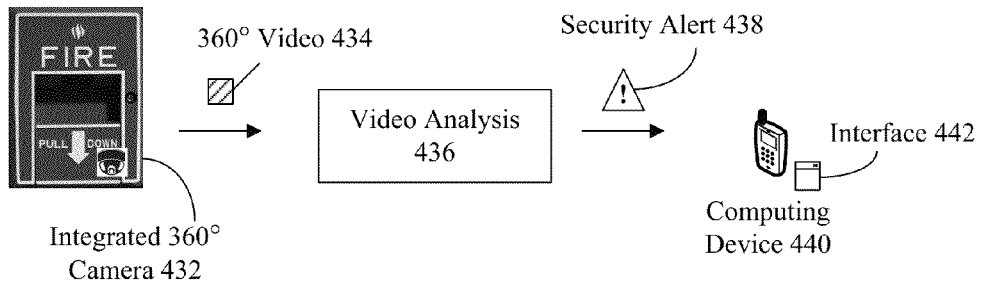

FIG. 4 is a schematic diagram illustrating a set of embodiments 410, 430 for integrating a 360° panoramic camera within a fire pull station in accordance with an embodiment of the inventive arrangements disclosed herein. Embodiments 410, 430 can be performed in the context of embodiments 110, 130, 150, 170 system 210, and/or embodiments 310, 450.

In embodiment 410, an image adjustment 416 can be performed on a 360° image 416 from an integrated 360° camera 412. The integrated 360° camera 412 can include a fire pull station and a 360° camera. The adjustment 416 can produce an adjusted image 418 which can be conveyed to computing device 420. Image adjustment 416 can include, but is not limited to, perspective correction, lighting correction, image enhancement, image analysis, aberration correction, and the like. For example, camera 412 can capture a 360° image of a living room which can be image corrected for distortion and immediately presented on interface 422 of device 420.

In embodiment 430, a video analysis 436 can be performed on a 360° video 434 from an integrated 360° camera 432. The integrated 360° camera 412 can include a fire pull station and a 360° camera. In the embodiment, when video analysis 436 determines security threat, a security alert 438 can be conveyed to device 440. Analysis can include, but is not limited to, semantic analysis, object detection, motion detection, facial recognition, and the like. For example, camera 432 can analyze a video 434 to determine an intruder within a living room of a house and convey a security alert 438 which can be present on interface 442 of device 440.

Drawings presented herein are for illustrative purposes only and should not be construed to limit the invention in any regard. It should be appreciated that adjustment 416, video analysis 436 can be performed by one or more proprietary and/or traditional software programs. In one instance, adjustment 416 and/or analysis 436 can be performed by a networked element (e.g., networked computer) or can be performed on device 420, 440. For example, adjustment 416 and/or analysis 436 can be performed by a communicatively linked smart digital video surveillance system.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for a 360° camera within a fire pull station comprising:
   a 360° camera embedded within a fire pull station of a fire alarm system, wherein the fire alarm system comprises of at least one a fire detection component, a signaling component, and control panel;
   the fire pull station comprising of at least one of a mounting bracket and a housing, wherein the mounting bracket securely affixes the station to a surface, wherein the housing comprises of at least one of a power source, a pull, and a circuitry; and
   the 360° camera comprising of an image sensor, and a 360° lense array, wherein the camera obtains electrical power from the power source of the station.

2. The apparatus of claim 1, wherein at least one of the station and the camera comprises of a power converter, wherein the converter modifies the power source to provide electricity to the station and the camera simultaneously.

3. The apparatus of claim 1, wherein at least one element of the 360° camera is embedded within a faceplate of the station.

4. The apparatus of claim 1, wherein the 360° camera further comprises:
a wireless transceiver configured to communicate at least one of a video and audio feed from the image sensor to a communicatively linked computing device.

5. The apparatus of claim 1, wherein the 360° camera further comprises:
a data store configured to persist at least one of a video and audio feed from the image sensor.

6. The apparatus of claim 5, wherein the data store is a removable flash memory media.

7. The apparatus of claim 1, wherein the 360° camera is configured to analyze a video or audio feed from the image sensor to detect the presence of at least one of a fire threat and a security threat within the feed.

8. The apparatus of claim 7, wherein the 360° camera comprises of an alarm, wherein the alarm is triggered in response to the detection of the at least one fire threat and a security threat, wherein the alarm is at least one of a visible, audible alarm, and a silent alarm.

9. The apparatus of claim 1, further comprising:
the 360° camera of the fixture, responsive to detecting the at least one fire threat and a security threat, conveying a notification to a communicatively linked computing device.

10. The notification of claim 9, wherein the notification is at least one of an electronic mail notification and a text exchange notification, wherein the text exchange notification comprises at least one of a Short Message Service message and an Instant Message.

11. An apparatus for a 360° camera within a wall mounted fire pull station comprising:
a 360° fire pull station comprising of a fire pull station and a 360° camera;
the station comprises of a housing, wherein the housing comprises of a mounting bracket and a cavity, wherein the mounting bracket securely affixes the station to a surface, wherein the 360° camera resides within at least a portion of the cavity; and
the 360° camera comprising of a power source, an image sensor, and a 360° lense array, wherein the camera obtains electrical power from the power source of the station.

12. The apparatus of claim 11, wherein the 360° camera further comprises:
a wireless transceiver configured to communicate at least one of a video and audio feed from the image sensor to a communicatively linked computing device.

13. The apparatus of claim 11, wherein the 360° camera further comprises:
a data store configured to persist at least one of a video and audio feed from the image sensor.

14. The apparatus of claim 11, wherein at least one element of the 360° camera is embedded within the mounting bracket.

15. The apparatus of claim 11, wherein the 360° camera is communicatively linked to the station power source via a power converter, wherein the converter modifies the power source to provide electricity to the camera.

16. The apparatus of claim 11, wherein the 360° fire pull station, responsive to detecting at least one of a fire threat and a security threat, conveying a notification to a communicatively linked computing device.

17. A 360° wall mounted fire pull station comprising:
a 360° camera embedded within a fire pull station of a fire alarm system, wherein the activation of the fire pull station triggers the 360° camera to analyze an environment proximate to the fire pull station, wherein the camera comprises of a power source, an image sensor, and a 360° lense array, wherein the camera is configured to receive power from a power source associated with the fire alarm system;
when the analysis yields at least one of a fire threat and a security threat exists within the proximate environment, triggering an alarm communicatively linked to the fire pull station;
when the analysis yields no threat exists within the proximate environment, not triggering an alarm communicatively linked to the fire pull station.

18. The apparatus of claim 17, wherein the 360° camera is an Internet Protocol (IP) capable camera, responsive to detecting a fire or an intruder, conveying a notification to a communicatively linked computing device.

19. The apparatus of claim 17, wherein the power source of the 360° camera is a battery, wherein the 360° comprises of a power converter configured to transform power from the battery to power the 360° camera.

20. The apparatus of claim 17, wherein the 360° camera electrical configuration is configured to receive electrical supply from a low voltage supply or line voltage 24 VDC supply.

* * * * *